April 27, 1937.  F. A. SALISBURY  2,078,543
SPRAYING APPARATUS
Filed Feb. 25, 1935
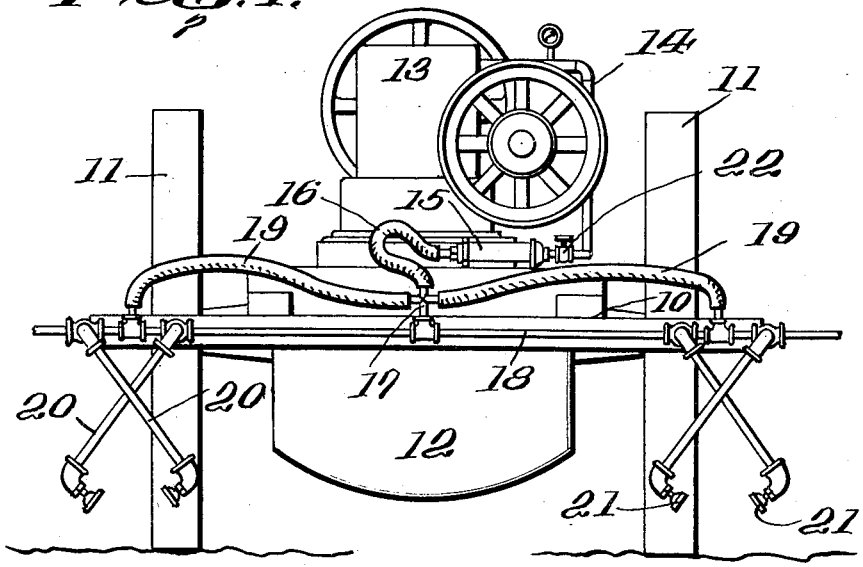
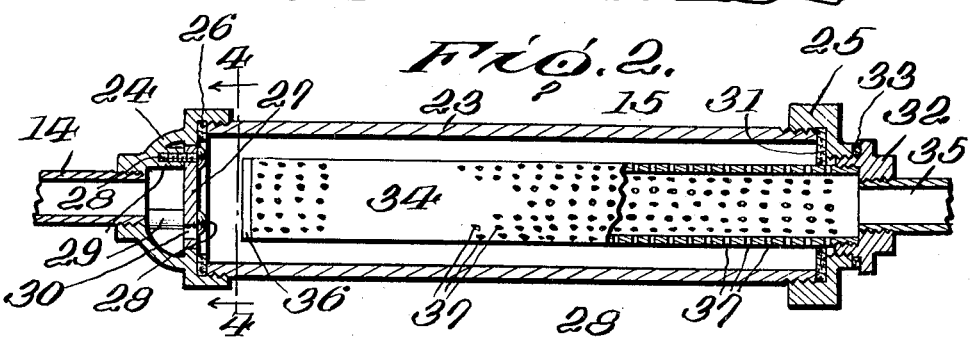
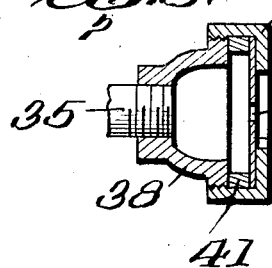
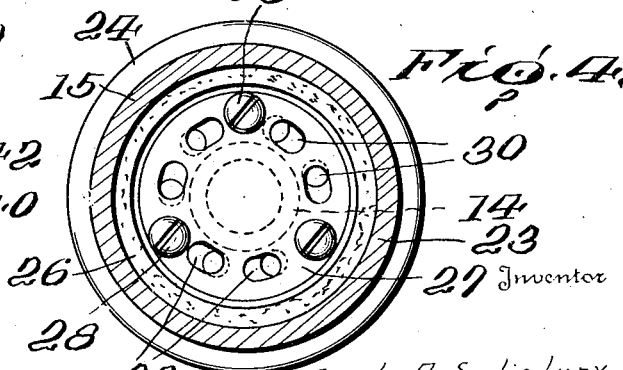
Inventor
Frank A. Salisbury
By Mason & Porter
Attorneys Patented Apr. 27, 1937

2,078,543

UNITED STATES PATENT OFFICE 2,078,543

SPRAYING APPARATUS

Frank A. Salisbury, Phelps, N. Y.

Application February 25, 1935, Serial No. 8,139

3 Claims. (Cl. 210—164)

The present invention relates to new and useful improvements in sprayers and more particularly to a sprayer having a filtering device for preventing clogging of the spray nozzles.

Heretofore, it has been the practice in the use of devices for spraying garden products, trees, or the like, to provide a filter in the spray nozzle in order to prevent the passage therethrough of coarse particles from the spray solution. Such filters must necessarily be relatively small and must be provided in each nozzle where a plurality of nozzles are employed with the spraying device. Obviously, this leads to a rapid clogging of the nozzles which necessitates the removal and taking apart of each nozzle for cleaning. The reaction of the metal parts of the nozzle and the particles in the spray solution often leads to irreparable damage to the nozzle.

An object of the invention is to provide, in a mechanical spraying device, a filtering device in the discharge line between the pump and the nozzle or nozzles.

A further object of the invention is to provide, in a spraying apparatus, a filtering device which is remote from the nozzle and which is adapted to prevent the passage therethrough of all particles which would not pass through the nozzle thereby insuring that the nozzle will not become clogged.

A still further object of the invention is to provide, in a spraying apparatus, a filtering device which effectively prevents clogging of the nozzles and which may be easily removed for cleaning so that the nozzles do not have to be disturbed.

The above and other objects of the invention will in part be obvious and will be hereinafter more fully pointed out.

In the accompanying drawing:

Fig. 1 is a diagrammatic view of the spraying apparatus with the filtering device in position.

Fig. 2 is a sectional view of the filtering device.

Fig. 3 is a sectional view of a nozzle.

Fig. 4 is an enlarged sectional view, taken along the line 4—4 of Fig. 2.

Referring more in detail to the accompanying drawing, the spraying apparatus, shown diagrammatically in Fig. 1, includes a frame 10 which is supported on wheels 11. The frame supports a suitable receptacle 12 which contains the spray solution. A motor (not shown) is adapted to operate a pump 13 which forces the spray solution through the discharge pipe 14. The filtering device 15 connects the discharge pipe 14 with a flexible hose 16 which leads to a four-way pipe fitting 17. The frame carries a transverse pipe 18 to which the pipe fitting 17 is secured. The pipe fitting is also connected to the transverse pipe line 18 at spaced points by flexible hose connections 19. The transverse pipe line 18 is provided with a plurality of downwardly extending pipe connections 20 which are provided with angularly disposed nozzles 21. These nozzles are adapted to direct the spray solution against the plants to be treated, and particularly low growing plants such as potatoes or the like. One or more of the nozzles may be removed and a flexible hose may be connected in place thereof for spraying trees or the like. The discharge pipe 14 is provided with a valve 22 so that the line may be shut off when it is desired to remove the filter 15 for cleaning.

The filtering device, shown in detail in Figs. 2 and 3, includes a cylindrical outer member 23 which may be made of brass or other suitable metal. This outer cylinder 23 has threaded on the ends thereof two coupling members 24, 25. The coupling member 24 is threaded onto the end of the discharge pipe 14. An annular washer 26 positioned between the end of the cylinder 23 and the coupling member 24 serves to prevent leakage. A disc 27 is held on the coupling member 24 by bolts 28 which are threaded into projections 29 on the coupling member. The disc 27 is provided with a plurality of angularly disposed openings 30 therethrough. These openings give a whirling motion to the solution as it enters the cylinder 23 and cause the fluid to be directed against the walls of the cylinder and along the same to the opposite end. A washer 31 between the opposite end of the cylinder 23 and the coupling member 25 prevents leakage. Threaded on the end of the coupling member 25 is a coupler 32 with a washer 33 between the same. The coupler 32 is adapted to support a cylinder 34 of brass or the like, which is threaded thereon and which communicates with a short pipe 35 over which the flexible hose 16 is fitted. The free end of the cylinder 34 is closed by a plug 36. The wall of the cylinder 34 is provided with a plurality of small holes 37. Thus, the fluid enters the outer cylinder 23 and is directed against the wall thereof, and thereafter passes through the holes 37 to the interior of the cylinder 34 from which it passes through the line to the nozzles 21. The coarse particles are thus prevented from entering the perforated cylinder 35 and are collected in the cylinder 23. The whirling of the entering fluid tends to keep the outer surface of the cylinder 34 clean in order to prevent clogging.

Each nozzle consists of a coupling member 38 which has an annular cap member 39 threaded thereon. The cap member 39 is adapted to hold a plate 40 against a bearing member 41. The plate has an opening 42 through which the spray solution may pass. This opening 42 is larger than the holes 37 in the cylinder 34, thus insuring the passage therethrough of any fine particles which pass through the holes 37 in the cylinder 34 so that the nozzle will not become clogged.

By the use of my improvements, it is possible to employ, in a spraying device, a filter which may be relatively large and which is placed at a point in the line remote from the nozzles and between the nozzles and the fluid pump. The filter is adapted to prevent the passage of all particles in the solution which would not pass through the nozzle so that no clogging at the nozzle can occur. The fluid entering the filter tends to keep the surface of the perforated cylinder clean so as to prevent clogging and often permits the spraying device to remain in service for a week or more without overhauling or cleaning. Furthermore, the filter, being in the line, may be easily removed for cleaning without disturbing the nozzles in any way. The cylinder 34 is of a rigid construction, thus permitting the use of very high pressures in the line without any danger of collapsing or otherwise damaging the filter. It is to be clearly understood that the improved filtering device may be used with any type of spraying apparatus and the type shown in the drawing is merely for purposes of illustration.

It is to be clearly understood that minor changes in the details of construction and arrangement of parts may be made without departing from the scope of the invention as set forth in the appended claims.

I claim:

1. A filtering device for use in the pressure discharge line of a spraying apparatus, comprising an outer casing, a perforated tube disposed within said outer casing with the side walls thereof spaced from the said casing and having one end thereof connected at the outlet end of said casing, the opposite end of said tube being spaced from the inlet end of said casing, and a plate closing the inlet end of said casing and spaced from the said opposite end of said tube, said plate having a plurality of angularly disposed openings therethrough for directing the entire volume of the entering solution against the walls of said casing and for imparting a whirling motion to the solution as it passes between the casing and the tube whereby to prevent clogging of the perforations in the tube.

2. A filtering device for use in the pressure discharge line of a spraying apparatus, comprising an outer casing, a perforated tube disposed within said outer casing with the side walls thereof spaced from the said casing, the open end of said tube being connected at the outlet end of said casing to the discharge line and the opposite end of said tube being spaced from the inlet end of said casing, a disc closing the said opposite end of said tube, and a plate closing the inlet end of said casing and spaced from the closed end of said tube, said plate having a plurality of angularly disposed openings therethrough around the edge thereof for directing the entire volume of the entering solution against the walls of said casing and for imparting a whirling motion to the solution as it passes between the casing and the tube whereby to prevent clogging of the perforations in the tube.

3. A filtering device for use in the pressure discharge line of a spraying apparatus, comprising an outer casing, a perforated tube disposed within said outer casing with the side walls thereof spaced from the said casing and having one end thereof connected at the outlet end of said casing, the opposite end of said tube being spaced from the inlet end of said casing, a coupling member secured to the inlet end of said casing for connection with the discharge line, a plurality of inward internally threaded projections on said coupling member, a plate adapted to be mounted on said projections, and screw means engageable with the internal threads on said projections for holding said plate in position, said plate having a plurality of angularly disposed openings therethrough around the edge thereof for directing the entire volume of the entering solution against the walls of said outer casing and for imparting a whirling motion to the solution as it passes between the casing and the tube whereby to prevent clogging of the perforations in the tube.

FRANK A. SALISBURY.